United States Patent [19]

Anton et al.

[11] 4,246,036
[45] Jan. 20, 1981

[54] COLORED COMPOSITE MATERIAL OF THE ASBESTOS-CEMENT OR SIMILAR TYPE AND ITS MANUFACTURE

[75] Inventors: Octavian Anton; Alain Gosseye, both of Brussels; Georges Poncelet, Beauvechain, all of Belgium

[73] Assignee: S.A. Redco, Kapelle Op Den Bos, Belgium

[21] Appl. No.: 39,082

[22] Filed: May 14, 1979

[51] Int. Cl.³ .................................................. C04B 7/02
[52] U.S. Cl. ....................................... 106/99; 106/120
[58] Field of Search ................................. 106/120, 99

[56] References Cited

U.S. PATENT DOCUMENTS 2,880,101   3/1959   Ulfstedt ................................ 106/120

*Primary Examiner*—James Poer
*Attorney, Agent, or Firm*—Sprung, Felfe, Horn, Lynch & Kramer

[57] ABSTRACT

The colored composite material is manufactured from materials based on a hydraulic binder and dispersed reinforcing elements, for example fibrous. To obtain a colored material, a composition comprising a baked clay such as chamotte is used generally by replacing at least in part the silica in products preferably hardened under steam pressure. The materials obtained are useful particularly as covering elements for frontages in the building industry.

12 Claims, No Drawings

COLORED COMPOSITE MATERIAL OF THE ASBESTOS-CEMENT OR SIMILAR TYPE AND ITS MANUFACTURE

BACKGROUND OF THE INVENTION

1. Field of the Invention

The invention relates to composite materials based on a hydraulic binder and a reinforcing filler such as those, notably of the asbestos-cement type, which are used in the building industry. More precisely, it relates to materials based on a silica-calcareous hydraulic binder and to their manufacture.

2. Description of the Prior Art

Materials of this type are currently used, for example in the form of plates, tiles or pre-fabricated panels, both as coverings for facades and other walls in the building industry. They are obtained by hardening mixtures containing essentially a hydraulic binder, calcareous or silico-calcareous, a reinforcing filler, constituted generally from mineral and/or organic fibers, namely asbestos most often, and if necessary other fillers or additives. The products preferred among the materials at present known are, at least for outside uses, those for which the constituents of the starting mixtures comprise not only cement and asbestos, but also sand which introduces silica into the final composition. Their hardening, carried out entirely at the manufacturing plant, generally involves treatment in a steam atmosphere, which is carried out mostly in an autoclave, at pressure above atmospheric pressure.

These materials have met with great success. In the covering of facades for example, they play a role which is both protective and decorative. However, extension of their use has been retarded by difficulty in responding, in this double role, to the more and more stringent requirements of users. On the other hand, various treatments, more or less simple or expensive, have been developed to avoid their degradation over time, which is marked by the appearance of efflorescence on the materials exposed to humidity and to bad weather. On the other hand, the manufacture of colored materials by means of industrial pigments runs up against difficulties in obtaining products whose color is homogeneous and reproducible. In addition, the degradation caused by aging is doubled by a certain washing out of the pigment, further accentuating the phenomenon.

It is an object of the present invention to overcome these drawbacks of conventional techniques, by means of a process and a composition which enables the coloration in a mass of the material to be ensured whilst preserving good qualities of resistance to bad weather, the latter being even possibly improved.

GENERAL DESCRIPTION OF THE INVENTION

To this end, the invention consists principally of introducing baked clay into the basic composition of the mixtures from which the materials are manufactured. The manufacture itself is then carried out by known techniques. The latter consists generally of depositing a mixture of solid constituents in suspended state on a filtering support and removing the suspending medium by filtration to collect a wet product, formed by one or several successive layers, which is then hardened and dried. The hardening can be carried out either in a moist atmosphere at ambient temperature, or with heat under steam pressure in an autoclave, according to the nature of the hydraulic binder, that of the reinforcing filler, and the mechanical strength desired for the materials finally obtained and the type of use. These two modes of hardening may be used in practicing the present invention, with preference however for hardening under steam which facilitates the reaction of the constituents. In the latter case, the steam pressure is advantageously over 6 bars.

In accordance with the invention, the mixture used comprises at least a hydraulic binder, calcareous or silico-calcareous, a reinforcing filler, in the form of dispersed elements, notably fibrous, and baked clay, such as chamotte, in a sufficient proportion to color the material obtained after hardening.

On the other hand, the relative proportions of the constituents of the binder and of the clay respect the proportions by weight: $CaO/(SiO_2+Al_2O_3)$ comprised between 0.4 and 1.0, and preferably between 0.5 and 0.7, and $Al_2O_3/(SiO_2+Al_2O_3)$ comprised between 0.07 and 0.30, and preferably between 0.12 and 0.20.

The hydraulic binder is mostly constituted essentially of cement, to which is generally added quartz sand, or any other form of silica. The preferred reinforcing filler is asbestos. However, asbestos may be replaced in part or entirely by other dispersed reinforcing elements, fibrous or non-fibrous, which are of a mineral nature, such as natural or industrial mineral fibers or metallic fibers, or of an organic nature such as natural, artificial or synthetic organic fibers, without departing from the scope of the invention.

Particularly advantageous compositions according to the invention comprise, by weight:
Hydraulic binder, 30 to 85%
Reinforcing fiber, 2 to 30%
Baked clay, 10 to 48%,
or, preferably:
Cement, 35 to 55%
Silica, 2 to 30%
Asbestos, 5 to 20%
Baked clay, 15 to 45%.

The clay used is baked prior to its incorporation in the composition, at a temperature comprised notably between 600° and 1200° C. It has advantageously an alumina content comprised between 10 and 50%, and preferably between 15 and 30% by weight. In particular, as baked clay, chamotte of thermal generating stations is used, which is a current product largely available in commerce for other industries, in different colors. From the mineralogical point of view, the chamottes are essentially constituted by a mixture of mullite and of quartz and/or cristobalite, these phases being more or less well crystallized, according to the temperature of baking the clay. The overall ratio $Al_2O_3/SiO_2$ is here generally comprised between 0.2 and 0.5. However, it is also possible to use, for example, fly ashes as such or more or less freed from the carbon that they contain, or any other material of which, whatever its origin, the mineralogical composition is similar to those of chamottes, with an alumina content comprised between 10 and 50%, baked at a temperature comprised between 600° and 1200° C. This temperature range corresponds to the destabilization by dehydroxylation of the lattice of the metastructures of clayey minerals until the appearance of the first phases of recrystallization stable at high temperature such as mullite.

This baked clay is used in ground form with a granulometry generally comprised between 0.1 and 0.5 mm, and preferably between 0.05 and 0.2 mm. These preferred dimensions are also desirable for the other solid constituents of the mixture which have to be placed in suspension.

According to the shade of baked clay used and its proportion with respect to the other constituents of the composition, there are obtained, after hardening, materials of variable coloring. In addition, the use of chamotte or of similar baked clay does not exclude the possibility of including in addition in the composition, other coloring fillers such as carbon black or any other coloring additive, to still further diversify the shades obtainable. It is also possible to prepare specially baked clays tinted with predetermined colors from clays having various contents of iron oxide, for example, from 0.05% to 40% by weight or supplemented with mineral coloring materials. Chamotte of thermal generating stations with less than 1% by weight of $Fe_2O_3$ leads to white colored products, whilst deeper colors are obtained by contents of $Fe_2O_3$ higher than 10% by weight, which can go up to 20 to 40% by weight.

In all cases, the method of introducing a color, by means of a baked clay in which it is present, enables excellent dispersion to be ensured in the mass of the composition and, consequently, the obtaining of stability, homogenity and durability of the color distinctly superior to those which are obtained by prior coloring techniques, by the addition of industrial pigments.

However, in addition, it is noteworthy that the increase in the content of alumina in the materials introduced by the baked clay, leads to improved chemical stability, manifested particularly by better resistance to aging agents. The invention also permits the improvement of other properties, such as the surface hardness and the abrasion resistance. Naturally, the properties of the products obtained according to the invention can be still further improved by subjecting them to treatments known in themselves moreover, such as surface treatments aimed at increasing the resistance to weathering.

From the mineralogical point of view, the materials according to the invention, obtained after hardening in a steam atmosphere and, preferably, after reaction in an autoclave under steam pressure comprised between 5 and 20, and preferably between 7 and 12 kg/cm², are characterized by the crystallization of aluminous tobermorite as the principal phase. The preferred proportions of the elements Ca, Si, Al, respecting the above-indicated ratios, facilitate precisely the formation of this tobermorite. It is hence possible to think that there is a reinforcement in the structure of the tobermorite due to the partial substitution of the silicon by aluminum and that this partly explains the improved properties of the materials. However, of course, this is a theoretical interpretation which should not restrict the scope of the invention.

DESCRIPTION OF PREFERRED EMBODIMENTS

The invention is described more completely below by way of examples which illustrate particular embodiments which are not to be regarded as in any way limiting.

EXAMPLES

Materials according to the invention, suitable for constructing covering elements for frontages, to be applied to the outsides of buildings, are prepared with the constituents indicated in Table 1 below.

In the three examples, the composition used comprises asbestos as reinforcing mineral fibrous filler, a silico-calcareous binder formed from cement and from quartz (or sand) and a baked clay. The latter is, according to the examples, either chamotte, red or white, or fly ash which can if necessary be partly freed from the carbon that it contains. The compositions of the baked clays used in the examples are indicated in Table 2.

In each example, the material is manufactured in the form of flat plates by means of a Hatschek type machine. The various constituents are mixed in the state of a suspension in water which is diluted by the addition of water recycled from the machine and led, by a pump or gravity, into a container provided with a rotary sieve. The latter takes up continuously from the suspension which it deposits on an endless conveyor belt of filtering material.

The solid constituents have a granulometry according to the distribution: >0.25 mm: 0%, >0.20 mm: maximum 7%, >0.10 mm: maximum 30%, <0.10 mm: minimum 63%. The mixture is prepared with 100 g of dry matter per liter.

The water filtering through the conveyor belt, by gravity and if necessary vacuum suction, can be collected for recycling, whilst the layer thus-formed on the belt is drawn off and transferred continuously to a rotating roller. When, by the stacking of successive layers on this roller, the desired thickness is reached, the wet product is cut-up along a generator of the cylinder and removed from the latter.

The moist product is placed flat, allowed to ripen in the ambient air for some hours, then introduced into an autoclave where it is kept for 8 hours, under 8 to 10 kg/cm² of steam pressure, at about 180° C.

The autoclave product finally obtained can undergo any surface treatment conventional in itself.

Mineralogical examination of the products shows that they are essentially constituted by aluminous tobermorite, that is to say of a tobermorite structure where the silicon is partly substituted by aluminum.

The properties of the materials are indicated in Table 1, following their compositions.

The resistance to efflorescence is studied by the ASTM test. After 30 cycles, and even 50 cycles, no efflorescence is observed on the plates of materials according to the invention, whilst efflorescences appear from 20 cycles in the case of plates produced from conventional cement-quartz-asbestos mixtures.

TABLE 1

|  | EXAMPLE | | |
| --- | --- | --- | --- |
|  | I<br>% weight | II<br>% weight | III<br>% weight |
| Composition |  |  |  |
| Asbestos | 13.4 | 8.8 | 13.4 |
| Portland cement | 42 | 49 | 44 |
| Quartz | 17 | 4 | 24 |
| Red chamotte | 26 | — | — |
| White chamotte | — | 38.2 | — |
| Fly ash | — | — | 18.6 |
| Carbon black | 1.6 | — | — |
| Properties |  |  |  |
| Density | 1.8 | 2 | 1.6 |
| Porosity (cm³/g) | 0.1 | 0.1 | 0.2 |
| Bending resistance (kg/cm²) | 350 | 350 | 280 |
| Efflorescence resistance (cycles) | >30 | >30 | >30 |
| Abrasion: loss after 3000 revolutions under |  |  |  |

TABLE 1-continued

| | EXAMPLE | | |
|---|---|---|---|
| | I % weight | II % weight | III % weight |
| a load of 11 kg (mg) | 0.14 | 0.14 | 0.25 |

TABLE 2

| | Red Chamotte % weight | White Chamotte % weight | Fly Ash % weight |
|---|---|---|---|
| $SiO_2$ | 55.84 | 76.14 | 54.35 |
| $Al_2O_3$ | 17.80 | 19.11 | 26.30 |
| $Fe_2O_3$ | 24.87 | 1.04 | 4.85 |
| CaO + alkalis | 1.49 | 3.71 | 6.65 |
| Carbon | — | — | 3.00 |
| Firing loss | — | — | 4.85 |

The abrasion resistance is determined with a Model 503 Taber Abraser apparatus, the test consisting essentially of measuring the weight loss of a specimen after 1000 and 3000 revolutions under an abrasive arm at constant load. This test reveals, for Examples I, II and III, an improvement of the order of a factor of 3 with respect to plates of conventional cement-quartz-asbestos composition.

Similar results to those of preceding examples are obtained in modifications of the method of manufacture, in particular in that wherein the mixture in aqueous suspension is deposited on a filtering support in a single layer from which the water is gradually removed by suction through the filtering support, and pressure between rolls.

Naturally, the invention extends to all modifications of the manufacturing method as well as to all the particular compositions which have been given by way of examples.

We claim:

1. Composition for the manufacture of a colored composite material, of the asbestos-cement type or the like, with good efflorescence resistance, comprising at least one hydraulic cement, a reinforcing filler, and baked clay, the relative proportions of the constituents of the cement and of the clay conforming to the proportions by weight: $(CaO/SiO_2+Al_2O_3)$ comprised between 0.4 and 1.0, $Al_2O_3/(SiO_2+Al_2O_3)$ comprised between 0.07 and 0.30, the baked clay being sufficient in proportion to color the material obtained by hardening the composition.

2. Composition according to claim 1, comprising a fibrous reinforcing filler and wherein for the total of cement and baked clay the ratio $CaO/(SiO_2+Al_2O_3)$ is comprised between 0.5 and 0.7 and the ratio $Al_2O_3/(SiO_2+Al_2O_3)$ between 0.12 and 0.20.

3. Composition according to claim 2, comprising by weight:
Cement, 30 to 85%
Reinforcing filler, 2 to 30%
Baked clay, 10 to 48%.

4. Composition according to claim 2, comprising, by weight:
Cement, 35 to 55%
Silica, 2 to 30%
Asbestos, 5 to 20%
Baked clay, 15 to 45%.

5. Composition according to claim 2, wherein the baked clay is chamotte of alumina content comprised between 10 and 50%, baked at a temperature comprised between 600° and 1200° C., or a substance of similar mineralogical composition.

6. Composition according to claim 3, wherein the baked clay is chamotte of alumina content comprised between 10 and 50%, baked at a temperature comprised between 600° and 1200° C., or a substance of similar mineralogical composition.

7. Composition according to claim 4, wherein the baked clay is chamotte of alumina content comprised between 10 and 50%, baked at a temperature comprised between 600° and 1200° C., or a substance of similar mineralogical composition.

8. Method of manufacturing a composite material of the asbestos-cement type or the like, comprising forming a mixture having a composition according to claim 1, from a suspension by filtration, and hardening the shaped mixture, at least in part in an atmosphere of pressurized steam.

9. Method of manufacturing a composite material of the asbestos-cement or similar type, comprising shaping a mixture having a composition according to claim 5, from a suspension by filtration, and hardening the shaped mixture, at least in part in an atmosphere of pressurized steam.

10. Composite materials whenever obtained by the method according to claim 8.

11. Composite materials whenever obtained by the method according to claim 9.

12. Colored asbestos-cement materials having the constitution defined in claim 1, constituted essentially by aluminous tobermorite and in which the alumina is provided at least in part by the baked clay.

* * * * *